United States Patent [19]

Griffin, Jr. et al.

[11] 4,083,407
[45] Apr. 11, 1978

[54] SPACER COMPOSITION AND METHOD OF USE

[75] Inventors: Thomas J. Griffin, Jr., Sand Springs; Larry K. Moran, Tulsa, both of Okla.

[73] Assignee: The Dow Chemical Company, Midland, Mich.

[21] Appl. No.: 766,835

[22] Filed: Feb. 7, 1977

[51] Int. Cl.² ............ E21B 21/00; E21B 33/14; E21B 33/16
[52] U.S. Cl. ............ 166/291; 106/81; 106/84; 252/8.55 B
[58] Field of Search ......... 166/291, 294, 312, 292; 106/81, 74, 76, 84; 252/8.5 A, 8.55 R, 8.55 B, 8.5 B

[56] References Cited

U.S. PATENT DOCUMENTS

| | | | |
|---|---|---|---|
| 2,146,693 | 2/1939 | Vietti et al. | 252/8.5 B |
| 2,350,161 | 5/1944 | Gloor | 106/81 |
| 2,848,051 | 8/1958 | Williams | 166/291 |
| 3,294,563 | 12/1966 | Williams | 106/74 |
| 3,333,973 | 8/1967 | Freiman | 106/74 X |
| 3,435,899 | 4/1969 | McLaughlin et al. | 166/292 |
| 3,653,441 | 4/1972 | Tuttle | 166/291 |
| 3,679,001 | 7/1972 | Hill | 166/292 |
| 3,850,248 | 11/1974 | Carney | 166/291 |
| 3,998,973 | 12/1976 | Carlson | 252/8.5 A |
| 4,014,174 | 3/1977 | Mondshine | 166/292 X |

*Primary Examiner*—Stephen J. Novosad
*Attorney, Agent, or Firm*—Glenn H. Korfhage

[57] ABSTRACT

A composition comprising water, a water soluble alkali metal silicate, and a water soluble metal compound capable of releasing a multivalent metal cation to react with the soluble silicate to form a pumpable gel is employed as a spacer for displacing a drilling mud from a borehole, particularly immediately preceding injection of a fluid, such as a cement slurry, containing compounds capable of detrimentally reacting with the mud. Optionally, the composition may contain one or more of: a water dispersible cellulose compound and an inert particulate which cooperate to provide fluid loss control; a chelating agent for polyvalent metal cations; a weighting material; a material to minimize lost circulation, and a salt to stabilize fresh water sensitive sandstones and shales.

58 Claims, No Drawings

SPACER COMPOSITION AND METHOD OF USE

BACKGROUND OF THE INVENTION

A. Field of the Invention

The invention relates to a composition suitable for use as a fluid spacer. It also relates to a method of using the spacer composition, particularly in the context of cementing casing in a wellbore.

B. Description of the Prior Art

Rotary drilling techniques are commonly used for drilling wells into the earth. In the rotary drilling of a well, a drilling fluid or mud is circulated between the surface of the earth and the bottom of the well. Drilling muds which are commonly used include water based drilling muds, including both clay and polymer containing muds, oil based drilling muds, and emulsions. Drilling muds serve many useful purposes including the removal of earth cuttings from the well, control of formation pressures, and cooling and lubrication of the drill bit used in forming the well. However, there are also certain detrimental characteristics associated with drilling muds.

Among the problems associated with drilling muds, is that drilling muds tend to flow from the well into exposed permeable formations with the result that mud solids are filtered out on the wall of the well and a filter cake is formed thereon. Even thin filter cakes are detrimental in the completion of wells in that they interfere with obtaining a good cement bond between the wall of the well and the conduit, or casing, positioned in the well. Also, drilling muds frequently contain components which are incompatible with fluids which one may desire to inject into a well containing a mud. For example, it has long been recognized that if certain cement slurries containing free polyvalent metal cations, especially calcium, are brought into contact with muds containing clay or certain polymers, a very viscous and detrimental plug can form in the vicinity of the mud-cement interface. High pressures required to move such a plug can rupture tubing, or make it necessary to stop pumping to avoid rupturing the tubing with the result that appreciable volumes of cement are left inside the tubing. Also, the high pressures can cause fracturing of the formation, thus causing loss of cement to the formation and formation damage. A similar plug forming phenomenon can occur when certain muds are contacted with fluids other than cement, such as certain brines. Another example of mud-cement incompatibility is that lignins, frequently used as dispersants in high density muds, can cause excessive retardation in cements if the cement becomes comingled with the mud.

For these reasons, various techniques have been developed for the removal of drilling muds from a borehole, particularly in the context of injecting a fluid into the borehole where said fluid is not compatible with the mud, and even more particularly, in the context of cementing. A common technique is to employ a "spacer" or "chemical wash". Although it is not always clear in the literature whether a particular fluid is a spacer or a chemical wash, a spacer is generally characterized as a thickened composition which functions primarily as a fluid piston in displacing the mud. Frequently, spacers contain appreciable quantities of weighting materials and also include fluid loss control agents. Chemical washes, on the other hand, are generally thin fluids which are effective principally as a result of turbulence, dilution, and surfactant action on the mud and mud filter cake. Chemical washes may contain some solids to act as an abrasive, but the solids content is generally significantly lower than in spacers because chemical washes are generally too thin to have good solids carrying capacity. Spacers are particularly useful where increased viscosity is required to displace a particular mud, or where high reservoir pressure requires a weighted fluid to maintain the required hydrostatic head.

Oil based chemical washes or spacers are disclosed in Means et al., U.S. Pat. No. 3,086,938; Messenger, U.S. Pat. No. 3,688,845; Hill et al., U.S. Pat. No. 3,749,173; and Motley et al., U.S. Pat. No. 3,820,602 and U.S. Pat. No. 3,849,316. Oil based chemical washes or spacers, however, generally do not perform well with water based muds.

Emulsion spacers or washes are disclosed in Parker, U.S. Pat. No. 3,625,286; Tuttle, U.S. Pat. No. 3,653,441; Carney, U.S. Pat. No. 3,850,248; and in Journal of Petroleum Technology, August, 1974, page 856. Webb, U.S. Pat. No. 3,532,168 teaches a micellar solution. Emulsions, however, do not lend themselves to easy preparation in the field.

Substantially water based fluids have also been proposed for use as spacers or chemical washes. A water buffer fluid is taught in *Neft. Khoz.*, v. 44, n. 12, p. 25–29 (Dec. 1966) (in Russian—English abstract at 1967 *Petrol. Abstr.* 80611). Williams, U.S. Pat. No. 2,848,051, employed a composition consisting essentially of insoluble inorganic materials in oil or in water. Lawrence, U.S. Pat. No. 2,582,909, formed a spacer gel by reacting a dilute solution of clay based drilling mud with an inorganic metal salt to form an inhibited gel having a viscosity about equal to that of the uninhibited mud itself. Savins et al., U.S. Pat. No. 3,291,211, taught a liquid, which could be either aqueous or organic, containing a dissolved solute to impart viscoelastic properties to the liquid. However, Savins et al. names as suitable solutes for aqueous systems, only organic compounds. In a later patent, U.S. Pat. No. 3,299,952, Savins teaches use of an aqueous solution of polyvinyl alcohol and borate ions. Wieland et al., U.S. Pat. No. 3,878,895, teaches an aqueous mixture of guar gum, a clay stabilizer such as an alkali metal chloride, calcium chloride, or zirconium oxide, a turbulence inducer such as the condensation product of mononaphthalene sulfonic acid and formaldehyde, an acid-soluble particulate such as powdered limestone, and polyethyleneimine. Maly et al., U.S. Pat. No. 3,866,683, teaches using as a spacer, a gelled aqueous hydrated clay suspension. An aqueous spacer which has been employed commercially comprised an aqueous gel of bentonite and guar gum. Another commercial aqueous based spacer is discussed in Society of Petroleum Engineers Preprint 1772 (1967). McKinney et al., U.S. Pat. No. 3,411,580, employed an aqueous gel comprised of a polysaccharide and a cross-linking agent therefor, such as boric acid. While some of these systems have found some measure of commercial success, most have suffered from at least one deficiency, such as compatibility with only a rather limited number of muds, a tendency to flocculate when used with certain cements, difficulty in mixing, susceptibility to bacterial degradation, difficulty in cleaning of equipment, and waste disposal problems. Accordingly, the industry has continued to search for new and improved spacer and wash compositions.

Other relevant art includes Messenger, U.S. Pat. No. 3,467,193, which taught use of an aqueous preflush containing a dispersant, which was followed by a spearhead of cement slurry containing a turbulence inducer, which was followed in turn by a densified cement slurry. Messenger, U.S. Pat. No. 3,884,302, used an aqueous alkaline flush having a pH of at least 10, which was followed by an aqueous fluid which formed a viscous film at the interface with the alkaline flush. Messenger, U.S. Pat. No. 3,348,612, further illustrates the state of the art. Crinkelmeyer, U.S. Pat. No. 3,605,897, teaches that glycols can be used to separate slugs of fluids. A surfactant is taught in *J. Jap. Ass. Petrol. Technol.* v. 35, No. 2, pp. 83–88, March 1970 (in Japanese; English abstract at *Petrol. Abstr.* v. 11, part 2, entry 143,459 (Apr. 17, 1971)). Various surfactant systems are reviewed at *Neft. Khoz.* No. 12, pp. 9–12, December, 1974 (in Russian; English abstract at *Petrol. Abstr.* v. 15, part 2, entry 204,636 (1975)).

None of the foregoing art suggests to employ as a spacer, water gelled with a water soluble silicate and a water soluble metal compound containing a multivalent metal cation capable of reacting with the silicate.

It has been known to use a water soluble silicate and polyvalent metal salt in cements, grouts, and soil sealing compositions, but not as a spacer. Peeler, Jr., et al., U.S. Pat. No. 3,335,018, taught use of a composition comprising water, a silicate, an amide, neat cement, and a salt reactive with the silicate as a soil sealant. Sullivan, U.S. Pat. No. 2,274,566, taught a grouting composition comprised of paper, water, sodium silicate, and a reactive salt. Japanese Pat. No. 45-7819; Scripture, Jr., U.S. Pat. No. 1,982,541; Drummond, U.S. Pat. No. 2,336,723; and Australian Pat. No. 292,794 also contain similar teachings. Canada Pat. No. 733033 disclosed a slurry comprised of whipped or beaten reaction products of a water solution of sodium silicate and flocculating or gelling agents for such silicates, optionally including sand, cements, or weighting materials. The slurry is said to be useful as a grout or drilling mud.

The teachings of each of the patents and other publications hereinabove specifically referred to are expressly incorporated herein.

SUMMARY OF THE INVENTION

It has now been discovered that a composition comprising water, a water soluble silicate, and a water soluble metal compound capable of releasing a multivalent metal cation to react with the soluble silicate to form an aqueous pumpable gel is an excellent spacer for displacing a drilling mud from a borehole, particularly immediately preceding injection of a fluid containing compounds capable of detrimentally reacting with the mud, such as a cement slurry for cementing a conduit in place within the borehole. Optionally, the composition may contain one or more of: a water dispersible cellulose compound and an inert particulate which cooperate to provide fluid loss control; a chelating agent for polyvalent metal cations; a weighting material; and a material to minimize lost circulation.

Another aspect of the invention is the composition employed in a preferred embodiment of the method, viz., water, a water soluble silicate, a water soluble metal compound capable of releasing a multivalent metal cation to react with the soluble silicate, a water dispersible cellulose compound, and an inert particulate.

Still another aspect of the invention is a dry blend of materials which may be added to water to obtain the composition summarized in the preceding paragraph.

Practice of the present invention generally results in superior zone isolation, improved bond logs, and reduced chance of lost circulation attributable to pressure build-up from viscous mud-cement plugs. By making possible an improved cementing job, practice of the present invention also reduces the chance of stimulation treatments, e.g. acidizing or fracturing, going out of zone due to poor zone isolation. Thus, yet another aspect of the invention comprises an improved method of stimulation.

FURTHER DESCRIPTION OF THE INVENTION

The abbreviation "BWOW" as used herein and in the appended claims means "by weight of water".

The spacer fluid employed in the present invention is compatible with a broad range of drilling muds, including aqueous (brine or fresh water) based, oil based, and emulsion muds, up to temperatures of at least about 300° F. Preferably, the invention is practiced in conjunction with aqueous based muds or oil-in-water emulsion muds. Although the present invention is believed more universally suited for use with a wide variety of muds than prior art spacers, muds do vary considerably; hence it is recommended that the spacer-mud compatibility be verified prior to use with a given mud. For example, occasional instances of incompatibility have been found with certain low density, untreated muds, having such a high viscosity that they themselves are nearly non-pumpable. The spacer may be used with such muds if the mud is first pre-treated with a chemical wash.

Likewise, though the spacer has been found compatible with a wide range of oil well cements, including both portland and aluminous based cements, it is recommended that the compatibility be verified prior to use with a particular cement slurry, and that routine thickening time and compressive strength tests be conducted on the cement slurry. For example, cements containing borate retarders are adversely affected by the spacer in that the spacer appears to reduce the effectiveness of the borate in retarding thickening times. In carrying out such verifying tests, incompatibility should not be confused with a slight gelation of spacer-mud mixtures. Some mixtures when left under static conditions will form gel structure. However, this gel structure is easily broken back and the mixture becomes very fluid with slight agitation. The water employed herein may be fresh water or brine. Polyvalent metal cations in the water supply may furnish a portion or all of the polyvalent metal cation component necessary for the practice of the invention.

Water soluble silicates which can be employed include alkali metal silicates in both anydrous and hydrated forms, e.g., ortho-, sesqui- and meta- silicates. General references on water soluble silicates are Vail, *Soluble Silicates, Their Properties and Uses*, Reinhold Publishing Co. (1952); Iler, *The Colloid Chemistry of Silica and Silicates;* and Vail, *Soluble Silicates in Industry*, The Chemical Catalog Co. (1928); the teachings of each of which are incorporated herein. Specific silicates which can be employed include, for example, lithium, sodium and potassium silicates. Specific silicate compounds which are useful are anhydrous sodium meta-silicate ($Na_2SiO_3$), hydrous sodium meta-silicate ($Na_2SiO_3.9H_2O$), sodium orthosilicate ($Na_4SiO_4$), and corresponding lithium and potassium compounds.

Water soluble metal compounds which can be employed include, for example, certain water soluble oxides, salts (e.g. acetates, halides, nitrates or sulfates) and hydroxides of multivalent metal cations. Water soluble compounds of such metals as alkaline earth metals, aluminum, copper, zinc, iron, and chromium, are exemplary of suitable compounds. The metal compound should be soluble in water to the extent of at least about 0.01 percent by weight at a temperature of 60° F. Most preferred is calcium chloride, which is highly soluble as contrasted to, for example, calcium oxide.

Certain combinations of water soluble metal compounds when employed with water soluble silicates are more effective in the practice of the invention than are certain other combinations. Therefore, in any particular application preliminary evaluation of specific water soluble multivalent metal compounds with specific water soluble silicates should preferably be made to determine the most effective combination. For example, it appears that water soluble metal compounds wherein the metal is divalent form gels quicker and better than do compounds containing trivalent cations and thus the divalent compounds are preferred when such properties are desired. Moreover, calcium compounds appear to be preferred when anhydrous sodium meta-silicate is employed. Calcium chloride, calcium acetate and cupric chloride are preferred with hydrous sodium meta-silicate, with calcium chloride being most preferred. Calcium chloride is preferred with sodium ortho-silicate.

Where both the silicate and the polyvalent metal cation releasing compound are provided in particulate form, the silicate is more easily dispersed and dissolved in the water if the polyvalent metal cation releasing compound is added to the water prior to or concurrently with the silicate.

The silicate and the polyvalent metal cation releasing compound are provided in the water in amounts so that they cooperate to form a pumpable gel. Generally, the water soluble silicate (calculated on an anhydrous basis) is provided in an amount of from about 0.1 to about 5 weight percent of the water, preferably 0.5 to about 3 percent, and the water soluble metal compound is provided in an amount sufficient to release for reaction with the silicate, from about 30 to about 130 percent of the molar equivalents of the polyvalent metal cation theoretically necessary to replace the alkali metal cation of the water soluble alkali metal silicate, e.g. about 0.3–1.3 moles of $Ca^{++}$ per mole of sodium metasilicate. Preferably, the metal compound releases from about 70 to about 100 percent of the stoichiometric amount of the metal cation. To obtain an adequate gel within a practical amount of time, appropriate allowance should be made where the metal compound dissolves slowly or is of low solubility. For example, whereas an optimum of about 1 mole of calcium chloride is employed per mole of sodium metasilicate, an amount in excess of 2 moles is optimum where calcium oxide, calcium sulfatedihydrate, and the like are employed. While it is possible to practice the essence of the invention somewhat outside the foregoing ranges, there is rarely an advantage in doing so. Lesser quantities are generally unsuitable because where a spacer is employed it is usually desired to include at least some particulate material, and fluids having lesser quantities of silicate and polyvalent metal cation do not normally have desirable solids suspending properties. Excessive amounts of silicate, with a proportionately large amount of polyvalent metal cation, result in fluids difficult to pump. Disproportionately large amounts of polyvalent metal cation can react adversely with the mud, e.g. by severely thickening the mud.

To provide fluid loss control, the composition may contain an inert particulate and a water dispersible cellulose compound. The cellulose compound may be an alkyl cellulose (e.g. methylcellulose), a carboxyalkyl cellulose (e.g. carboxymethylcellulose), a carboxyalkyl hydroxyalkyl cellulose such as carboxymethylhydroxyethyl cellulose, a hydroxyalkyl cellulose such as hydroxymethyl cellulose, and the like. Carboxymethyl cellulose is preferred for economic reasons. Use of starches, natural gums such as galactommananas and their derivatives, and polyacrylamides is to be avoided. They are generally not suitable for use herein since they frequently give compositions having poor compatibility with many drilling muds.

Particulate materials suitable for use in providing fluid loss control in cooperation with the cellulose compound are well known. Suitable materials include, powdered silica materials such as silica flour, natural pozzolans, fly ashes, diatomaceous earth and other water inert powders such as calcium carbonate, barium sulfate, talc, and the like. Preferably, the particulate has a particle size diameter within the range of from about 1 to about 100 microns.

When fluid loss control is desired, the cellulose compound and inert particulate are employed in amounts such that together they cooperate to give the desired measure of fluid loss control. When employed, the cellulose compound is preferably present in an amount of from about 0.5 to about 1.5 percent, by weight of water, and most preferably from about 0.75 to about 1.25 percent. Little fluid loss control is obtained using less than 0.5 percent, while more than 1.5 percent can result in loss of temperature stability and excessive cement retardation. Only slight fluid loss improvement is realized between 1.25 and 1.5 percent, and the risk of adverse effect is greater at the higher concentration. The particulate may be employed in amounts ranging from about 1 to about 100 percent, by weight of water, though those skilled in the art will realize that the solids carrying capacity of the fluid should not be exceeded in any particular embodiment. Preferably, from about 5 to 15 percent particulate is employed; fluid loss control obtained with greater amounts of particulate is not significantly better than that obtained with about 15 percent particulate. In a most preferred embodiment, about 1 percent carboxymethyl cellulose is employed together with about 10 percent silica flour which passes through a 200 mesh screen, U.S. Sieve Series.

Optionally, the spacer composition contains a weak chelating agent for polyvalent metal cations in an amount of up to about 2 percent by weight of the water. By "weak chelating agent" is meant an agent which will chelate or precipitate polyvalent metal cations in the substantial absence of unreacted sites on the silicate, but which will not prevent reaction of polyvalent metal cations with the silicate so long as a reaction would otherwise occur between the silicate and the cation but for the presence of the chelating agent. Thus, the purpose of the chelating agent is to act as a scavenger for any excess polyvalent metal cations which could flocculate the drilling mud. The weak chelating agent, however, does not significantly affect the reaction of the polyvalent metal cations with the silicate. Suitable chelating agents for this purpose include citric acid, alkali metal citrates, alkali metal hexametaphosphates, alkali metal tetraphosphates, alkali metal bicarbonates, sodium acid pyrophosphate, and the like. Most preferably, about 1 percent sodium citrate dihydrate is employed, by weight of water.

The spacer may also contain weighting material to provide a desired density, e.g. up to about 20 lbs/gallon. Preferably, the spacer is designed to have at least as great a density, gel strength, and viscosity as that of the drilling fluid, under conditions present in the borehole, but it should have a density less than that of the cement. The weighting material can also affect gel strength and viscosity to some extent. For example, weighting material having a small particle size tends to increase the apparent viscosity and gel strength of the spacer. Suitable materials include density increasing solids such as barium sulfate, fly ash, pozzolan, hematite, ilmenite, silica, and the like. Depending on the density of the materials, certain particulate materials used as fluid loss control agents may also serve as weighting materials, and where such particulates are present in an amount greater than about 15 percent BWOW, the excess over about 15 percent may be regarded as functioning principally as a weighting agent and only secondarily as further contributing to fluid loss control obtained with amounts of particulate less than about 15 percent.

As those skilled in the art will realize, the amount of weighting agent to be employed will vary greatly depending on the material used as a weighting agent, the desired weight of the slurry, and the like. For example, if 50 pounds of a blend comprised of, by weight, about 13.2% sodium metasilicate, 14.4% commercial calcium chloride flake containing 77–80 weight percent active $CaCl_2$, 6.6% carboxymethylcellulose, 6.6% sodium citrate dihydrate, and about 60% ground silica is added to 39.3 gallons of water, one 42-gallon barrel of 9 pounds per gallon spacer will be obtained. If a spacer of greater density is desired, the amount of weighting material to be added to the above mentioned 50-pound blend is calculated by the formula $$P = \frac{42D - 378}{1 - VD}$$

where
$P$ = pounds of weighting material
$D$ = the desired density in pounds per gallon and
$V$ = the absolute volume of the weighting material in gallons per pound.

Thus, by adding 297 pounds of fly ash (absolute volume = 0.048 gal/lb) to the foregoing, a 12 lb/gal spacer is obtained. Similarly, a 19 lb/gal spacer is obtained by adding about 780 pounds of hematite to the basic formulation initially described in this paragraph.

The spacer may also include other materials for their known purposes, such as kolite, gilsonite, cellophane flakes, and the like for lost circulation control, provided they do not render the spacer incompatible with the mud or the cement. Where a cement is to contain a lost circulation material, for instance, the same material may be employed in the spacer. Minor amounts of an antifoaming agent may be included to provide better mixing properties, e.g. up to about 1 percent by weight of water. Excessive amounts of antifoaming agent hinder gel formation. Where a formation is present which is sensitive to fresh water, such as certain shales or clay containing sandstone, a salt such as an alkali metal halide may be incorporated in the spacer.

In practicing the present invention the spacer is injected by conventional techniques, e.g. preferably down the casing to drive the mud up and out of the borehole via the annulus, though the spacer may also be injected down the annulus to drive the mud up the inside of the casing if desired. A sufficient quantity of spacer is employed to separate the leading fluid (e.g. mud) from the trailing fluid (e.g. cement), and to maintain an uncontaminated zone of spacer between the leading and trailing portions of the spacer which may become somewhat contaminated with the leading or trailing fluids, respectively. It is recommended that sufficient spacer be employed to separate the leading fluid from the trailing fluid by at least about 200 feet, and preferably at least about 500 feet, calculated on the basis of the average cross sectional area of the annulus, although lesser volumes of spacer may be employed depending on the nature of the fluids being separated.

EXAMPLES AND COMPARISON RUNS

The practice of the various aspects of the present invention and its advantages over the prior art are further illustrated in the following examples and comparison runs:

In the following tests, three muds have been used extensively:

"11.5 ppg Standard"—a simulated mud prepared by admixing 4 percent BWOW bentonite with water in a laboratory blender for 2 minutes, adding 0.05 percent BWOW NaOH and admixing for an additional 2 minutes, and by adding 53.4 percent BWOW barium sulfate and admixing for yet another 2 minutes;

"15.0 ppg Standard"—prepared in the same manner as the 11.5 ppg Standard, except using 0.08 percent NaOH plus 0.12 percent $Na_2CO_3$ in the second step, and 137 percent barium sulfate in the third step;

"Alaskan Mud"—an 11.4–11.6 lb/gal mud provided by a third party, which is believed to contain bentonite, barite, caustic, ferrochrome lignosulfonate and causticized lignite, drilled formations solids, and fresh water. The mud is being used in North Slope drilling, but is severely incompatible with cement.

Where reference is made to calcium chloride flake, the product used was Dowflake brand calcium chloride flake which contains 77–80 weight percent $CaCl_2$, the balance being principally water of hydration and minor amounts of impurities.

Reference will be made to a Bottle Shake Test. In the test, fluids tested were charged into a four fluid ounce bottle in the stated volume ratios. The bottle was capped, vigorously shaken 30 times, the cap removed, and the resulting mixture examined for signs of incompatibility such as clabbering and permanent thickening. Unless otherwise noted, the cement slurry employed in the Bottle Shake Test was Oklahoma H plus 38% water by weight of cement, and the mud was 15.0 ppg Standard, hereinabove described.

EXAMPLE 1

Anhydrous sodium metasilicate, 1.5 grams; calcium oxide, 1.5 grams; hematite, 621 grams; and water, 300 ml were admixed and subjected to the Bottle Shake Test. The system was compatible with both cement, mud, and a mixture thereof, as indicated by the following data:

| Spacer-Mud Ratio | | |
| --- | --- | --- |
| 5:95 | 50:50 | 95:5 |
| thin | thick, but shakes easily | thin |

TABLE I-continued

| Grams anhyd. sodium metasilicate | Grams CaO | Moles Ca per mole Na$_2$ in starting materials | Extent of Particulate Settling in Spacer | Compatibility, spacer:mud | | | Free Water cm |
|---|---|---|---|---|---|---|---|
| | | | | 10:90 | 30:70 | 50:50 | |
| 1.75 | 2.6 | 3.2 | None | thick but shakes easily | very thick but shakes | thickened but pours | 1.8 |
| 1.75 | 4.4 | 5.5 | None | very thick but shakes | very thick but shakes | thickened but shakes easily | 2.3 |
| 3.5 (1%) | 3.15 | 2.0 | None | slightly thickened | thickened but pours | thickened but pours easily | 1.7 |
| 3.5 | 4.03 | 2.5 | None | slightly thickened | thickened but shakes easily | thickened but pours slowly | 0.9 |
| 3.5 | 4.90 | 3.0 | None | very thick but shakes | very thick but shakes | thickened but shakes easily | 1.1 |
| 5.25 (.15%) | 1.52 | 0.6 | Severe | thin | thin | thin | 4.3 |
| 5.25 | 2.42 | 1.0 | Moderate | thin | slightly thickened | thin | 3.2 |
| 5.25 | 3.15 | 1.3 | Slight | thin | thickened | slightly thickened | 2.9 |
| 5.25 | 4.20 | 1.7 | Slight | thin | thickened but pours | slightly thickened | 1.9 |
| 5.25 | 5.25 | 2.2 | None | thin | thickened but pours | thickened but pours easily | 1.1 |

EXAMPLE 7

For the runs reported in this Example, a base composition of 350 ml water, 3.5 grams sodium metasilicate, 78 grams barium sulfate, and 175 grams silica flour was employed. Various calcium salts were employed as the source of calcium, both with and without various amounts of different weak chelating agents. Results are tabulated in Table II. Blanks indicate test was not run, or component was not included in the composition. Compatibility tests were run against the 11.5 ppg Standard Mud.

TABLE II

| Calcium source, grams | NaHCO$_3$, grams | Citric acid, grams | Settling of particulate in spacer alone | Free Water in spacer alone, ml | Compatibility, spacer:mud | | |
|---|---|---|---|---|---|---|---|
| | | | | | 10:90 | 30:70 | 50:50 |
| 6.37g. calcium chloride flakes | — | — | none | 0.3 | thick, pours slowly | thick, but shakes easily | thick, but pours |
| 6.37g. calcium chloride flakes | 0.1 | — | — | — | — | thick, but pours | — |
| 6.37g. calcium chloride flakes | — | 0.1 | — | — | — | thick, but pours | — |
| 6.37g. calcium chloride flakes | 0.2 | — | — | — | — | very slightly thickened | — |
| 6.37g. calcium chloride flakes | — | 0.2 | — | — | — | thick, but shakes easily | — |
| 6.37g. calcium chloride flakes | 0.4 | — | — | — | — | thin | — |
| 6.37g. calcium chloride flakes | — | 0.4 | — | — | — | thick, but pours easily | — |
| 4.27g. Ca(OH)$_2$ | — | — | none | 0.3 | thick but shakes | thick but shakes | thick but shakes easily |
| 4.27g. Ca(OH)$_2$ | 0.1 | — | — | — | — | thick but shakes easily | — |
| 4.27g. Ca(OH)$_2$ | — | 0.1 | — | — | — | thick but shakes easily | — |
| 4.27g. Ca(OH)$_2$ | 0.2 | — | — | — | — | thick but pours easly | — |
| 4.27g. Ca/OH)$_2$ | — | 0.2 | — | — | — | thick, but pours | — |
| 4.27g. Ca(OH)$_2$ | 0.4 | — | — | — | — | thick but pours easily | — |
| 4.27g. Ca(OH)$_2$ | — | 0.4 | — | — | — | thin—some settling | — |
| 13.51g. Ca(NO$_3$)$_2$ . 4$_2$O | — | — | none | 0.5 | thick but shakes | thick but pours | thick but pours |
| 13.51g. Ca(NO$_3$)$_2$ . 4H$_2$O | 0.1 | — | — | — | — | thick but pours | — |
| 13.51g. Ca(NO$_3$)$_2$ . 4H$_2$O | — | 0.1 | — | — | — | thick but pours | — |
| 13.51g Ca(NO$_3$)$_2$ . 4H$_2$O | 0.2 | — | — | — | — | thick but pours | — |
| 13.51g. Ca(NO$_3$)$_2$ . 4H$_2$O | — | 0.2 | — | — | — | thick but pours | — |
| 13.51g. Ca(NO$_3$)$_2$ . 4H$_2$0 | 0.4 | — | — | — | — | thick but pours easily | — |
| 13.51g. Ca(NO$_3$)$_2$ .4 H$_2$O | — | 0.4 | — | — | thick but pours easily | — | — |
| 9.87 grams CaSO$_4$ . 2H$_2$O | — | — | none | 0.3 | thick but shakes easily | thick but shakes easily | thick but pours |
| 9.87 grams CaSO$_4$ . 2H$_2$O | 0.1 | — | — | — | — | thick but pours | — |
| 9.87 grams CaSO$_4$ . 2H$_2$O | — | 0.1 | — | — | — | thick but shakes easily | — |
| 9.87 grams CaSO$_4$ . 2H$_2$O | 0.2 | — | — | — | — | thick but pours | — |

-continued

| Spacer-Mud Ratio | | |
|---|---|---|
| Spacer:Cement | | |
| 5:95 | 50:50 | 95:5 |
| thin | thin | thin |
| 1:1:1 Cement:Spacer:Mud | | |
| slightly thickened | | |

EXAMPLE 2

Mixtures of 500 ml water, 330 grams barium sulfate weighting agent, 10 grams anhydrous sodium silicate, and various amounts of calcium chloride flake were admixed in a screening test to determine thickness as an indicator of solids carrying capacity. Results were as follows:

| Calcium Chloride Flake, grams | $Ca^{++}$ as % of Stoich. amount | Thickness Rank |
|---|---|---|
| 9.1 | 78 | 5 |
| 11.4 | 98 | 1 (best) |
| 13.7 | 117 | 2 |
| 15.9 | 136 | 3 |
| 18.2 | 156 | 4 |
| 27.3 | 234 | 6 (poorest) |

EXAMPLE 3

Samples of the mixture described in Example 2 containing 11.4 grams of the calcium chloride flake were prepared, and to each of these was added various amounts of $NaHCO_3$. Results were as follows:

| Amount $NaHCO_3$, grams | Observations |
|---|---|
| 1 | |
| 2 | Thickness about the same as Example 2 |
| 3 | |
| 5 | |
| 7.5 | Somewhat thinner |
| 10 | Much thinner; solids settled |

EXAMPLE 4

Referring again to the mixtures prepared in Example 2, compatibility of the mixtures having 78, 98, and 117% of the stoichiometric amount of calcium were tested for mud compatibility at 80° F. Samples were also evaluated after having been maintained at 170° F overnight. Results are as follows (in compatibility tests, a rating of "thin" is most favorable, indicating no tendency to form a viscous plug):

| $Ca^{++}$ as % of Stoich. amount | Mud:Spacer Volume Ratio | Compatibility at 80° F | Compatibility at 170° F |
|---|---|---|---|
| | 11.5 ppg Standard Mud | | |
| 78 | 20:80 | thin | thin |
| | 50:50 | thin | thin |
| | 80:20 | thin | thin |
| 98 | 20:80 | thin | thin |
| | 50:50 | thick but pourable | thick but pourable |
| | 80:20 | thin | thin |
| 117 | 20:80 | thin | thin |
| | 50:50 | thin | thick but pourable |
| | 80:20 | poor--too thick to pour | thick but pourable |
| | Alaskan Mud | | |
| 78 | 20:80 | thin | thin |
| | 50:50 | thin | thin |
| | 80:20 | thin | thin |
| 98 | 20:80 | thin | thin |
| | 50:50 | thin | thin |
| | 80:20 | thin | thin |
| 117 | 20:80 | thin | thick but pourable |
| | 50:50 | both borderline--thick but barely pourable | |
| | 80:20 | thin | thin |

Samples from Example 3 containing 1, 2 and 3 grams of $NaHCO_3$ were also tested for mud compatibility at 80° F and 170° F. Each was rated "thin" in all ratios tested except for the run wherein the spacer containing 1 gram $NaHCO_3$ was tested with the Alaskan Mud at a 50:50 ratio: the mixture was thick but pourable at both temperatures, with the mixture being somewhat thinner at 80° F.

By comparing Examples 2-4, it can be seen that spacer compositions having large excess of calcium tend to have a lower solids carrying capacity, and also tend to have reduced mud compatibility. Those having low calcium content have good compatibility but are somewhat lacking in solids carrying capacity.

EXAMPLE 5

Gels were made using sodium metasilicate with each of $MgSO_4$; $Al_2(SO_4)_3.18H_2O$; $FeCl_2.2H_2O$; and $BaCl_2$. Gels acceptable for use as a spacer were obtained from each.

EXAMPLE 6

A series of 12.0 lb/gallon spacer compositions was prepared wherein the amounts of sodium metasilicate and calcium oxide were varied, all other variables being kept constant. The compositions were prepared from 350 ml water, 232 grams barium sulfate, and the indicated amounts of CaO and silicate. Results of Bottle Shake Tests to determine compatibility of the compositions with the 11.5 ppg Standard Mud are tabulated in Table I, as are the results of Free Water tests on the spacer alone. In the Free Water tests, 100 ml of spacer was allowed to stand in an approximately 1¾ inch diameter, four fluid ounce bottle for one hour, at which time the depth of free water was measured with a ruler.

TABLE I

| Grams anhyd. sodium metasilicate | Grams CaO | Moles Ca per mole $Na_2$ in starting materials | Extent of Particulate Settling in Spacer | Compatibility, spacer:mud 10:90 | 30:70 | 50:50 | Free Water cm |
|---|---|---|---|---|---|---|---|
| 1.75 (0.5%) | 0.9 | 1.1 | Moderate | thin | thin | thin | 3.5 |
| 1.75 | 1.4 | 1.7 | Slight | thin | slightly thickened | slightly thickened | 2.6 |
| 1.75 | 2.1 | 2.6 | Very slight | thin | thick but shakes easily | thickened but pours | 1.7 |

TABLE II-continued

| Calcium source, grams | NaHCO₃, grams | Citric acid, grams | Settling of particulate in spacer alone | Free Water in spacer alone, ml | Compatibility, spacer:mud | | |
|---|---|---|---|---|---|---|---|
| | | | | | 10:90 | 30:70 | 50:50 |
| 9.87 grams CaSO₄ . 2H₂O | — | 0.2 | — | — | — | thick but pours | — |
| 9.87 grams CaSO₄ . 2H₂O | 0.4 | — | — | — | — | slightly thickened | — |
| 9.87 grams CaSO₄ . 2H₂O | — | 0.4 | — | — | — | thick but pours easily | — |

EXAMPLE 8

Fluid loss tests conducted substantially as set forth in API Bulletin RP 10B Section 8 (19th Edition) were carried out on a number of formulations. The data demonstrate cellulose compounds to be effective in controlling fluid loss when employed with a particulate, whereas other known fluid loss agents such as bentonite, resinous drilling mud fluid loss additives, and starches are ineffective, or at least much less effective. Two basic formulations were employed, each containing water and, BWOW:

for 30 minutes based on the results obtained over the shorter period. In the table, conventional abbreviations are used for the cellulose compounds, i.e., CMC for carboxymethyl cellulose, HEC for hydroxyethyl cellulose, and CMHEC for carboxymethylhydroxyethyl cellulose.

TABLE III

| | Additives | | | Fluid Loss | |
|---|---|---|---|---|---|
| Base Formulation | Weak Chelating Agent | Fluid Loss Control Agent | Other | Temp, °F, and 1000 psi | Corrected Fluid Loss, ml/30 min |
| A | — | — | — | 80 | ≃380 |
| A | — | 2% bentonite | — | 80 | ≃380 |
| A | — | 0.5% Impermix brand starch | — | 80 | 250 |
| A | — | 1.0% Impermix brand starch | — | 80 | 211 |
| A | — | 1.5% Impermix brand starch | — | 80 | 300 |
| A | 0.5% NaHCO₃ | 1.0% Impermix brand starch | — | 80 | 240 |
| A | — | 1.0% Dextrid brand cornstarch | — | 80 | ≃235 |
| A | 0.5% NaHCO₃ | 1.5% Piccovar 146 brand resin | — | 80 | ≃450 |
| A | — | 1.0% Resinex brand resin | — | 80 | ≃175 |
| A | — | 1.0% Resinex brand resin | 18% NaCl | 80 | ≃350 |
| A | — | 0.5% CMHEC | — | 80 | 165 |
| A | — | 1.0% CMHEC | — | 80 | 58 |
| A | — | 1.5% CMHEC | — | 80 | 54 |
| A | 0.5% NaHCO₃ | 0.5% CMHEC | — | 80 | 108 |
| A | 0.5% NaHCO₃ | 1.0% CMHEC | — | 80 | 67 |
| A | 0.5% NaHCO₃ | 1.5% CMHEC | — | 80 | 70 |
| B | 1.5% Na hexametaphosphate | 1.0% CMHEC | 57.6% BaSO₄ | 80 | 30 |
| A | — | 1.0% CMC | — | 80 | ≃68 |
| B | 0.5% NaHCO₃ | 1.0 CMC | — | 80 | 92 |
| B | 0.5% NaHCO₃ | 1.0% Natrosol 150 EXR brand HEC | — | 80 | 64 |
| B | 0.5% NaHCO₃ | 1.0% Natrosol 150 EXR brand HEC | 18% NaCl | 80 | 50 |
| B | — | 1.0% CMC | — | 144 | 30 |
| A | — | 1.0% CMC | 18% NaCl | 144 | 56 |
| B | 0.5% NaHCO₃ | 1.0% CMC | Hematite to 16 lb/gal | 150 | 34 |
| B | 0.5% NaHCO₃ | 1.0% CMC | 18% NaCl + BaSO₄ to 12 lb/gal | 150 | ≃390 |
| A | — | 1.0% CMHEC | — | 170 | 188 |
| A | — | 1% starch + 1% bentonite | — | 200 | Blew Out |
| A | 0.5% NaHCO₃ | 1.0% CMC | — | 200 | 60 |
| A | 0.5% NaHCO₃ | 1.0% CMC | 18% NaCl | 200 | 64 |
| A | — | 1.5% CMC | — | 200 | ≃68 |
| A | 0.5% NaHCO₃ | 1.5% CMC | — | 200 | ≃ 80 |
| A | — | 0.5% CMHEC | — | 200 | >200 |
| A | — | 1.0% CMHEC | — | 200 | ≃320 |
| A | — | 1.5% CMHEC | — | 200 | 48 |
| A | 0.5% NaHCO₃ | 1.0% CMHEC | — | 200 | 180 |

| Base A | | Base B |
|---|---|---|
| 2.0% | anhydrous sodium metasilicate | 1.5% |
| 2.3% | calcium chloride flake | 1.7% |
| 5.0% | silica flour (<200 mesh) | 9.6% |

To each of these was added various additives, as indicated in Table III. All percentages are BWOW. Results are also tablulated in Table III. In the table, "≃" preceding the fluid loss figure indicates the test was run for less than 30 minutes, and the reported figure is an estimate

EXAMPLE 9

Spacers were prepared containing, BWOW, 2% anhydrous sodium metasilicate, 2.3% calcium chloride flake, 5% silica flour (<200 mesh), 66% BaSO₄, and various amounts of carboxymethyl cellulose, with and without 0.5% NaHCO₃. The spacers were evaluated for compatibility at various spacer:mud ratios, and in a 1:1:1 cement:spacer:mud mixture. While desirable, it is not necessary for the spacer to be compatible with a mixture of both the mud and cement simultaneously, since such a mixture need not occur in cementing operations if a sufficiently large volume of spacer is employed. Two muds were used in the evaluation, the 11.5 ppg Standard Mud and the Alaskan Mud. The results are tabulated in Table IV, with the Alaskan Mud results appearing in parentheses.

TABLE IV

| Additive, with or without NaHCO$_3$ | Spacer:Mud Ratio | | | Cement:Spacer:Mud |
|---|---|---|---|---|
| | 10:90 | 50:50 | 90:10 | 1:1:1 |
| 0.5% CMC without | Both good | Both good | Both good | Good (Borderline) |
| 1.0% CMC without | Both good | Both good | Both good | Good (Too thick) |
| 1.5% CMC without | Both good | Both good | Both good | Borderline (Too thick) |
| 0.5% CMC with | Both good | Both good | Both good | Both good |
| 1.0% CMC with | Both good | Both good | Both good | Both good |
| 1.5% CMC with | Both too thick | Both too thick | Both too thick | Both too thick |

EXAMPLE 10

A spacer comprising water and, BWOW, 1.5% sodium metasilicate, 1.7% calcium chloride flake, 1% CMC, 0.5% NaHCO$_3$, and 9.6% ground silica weighted to 12 pounds per gallon with 57.2% BWOW BaSO$_4$ was prepared for testing under downhole conditions with Alaskan Mud and a cement slurry comprised of Kaiser Class G portland cement, 0.2% by weight of cement (BWOC) Lomar D, a condensed naphthalene sulfonate dispersant, 0.2% BWOC calcium lignosulfonate and 44% BWOC water. Thickening time tests were run according to standard procedures specified in Section 7 of API Bulletin 10B (19th Edition), using Schedule 6 to reach a BHCT of 158° F. Results appear in Table V.

TABLE V

| System | Time (Hr:Min) to 100 Uc |
|---|---|
| Cement alone | 2:10 |
| 20:80 spacer:cement | +3:30 |
| 50:50 spacer:cement | +3:30 |
| 50:50 cement:mud | 0:05 |
| 10:90 spacer:mud | +3:30 |
| 30:70 spacer:mud | +4:00 |
| 50:50 spacer:mud | +3:30 |
| 90:10 spacer:mud | +4:00 |
| 1:1:1 spacer:cement:mud | +4:00 |

From the data it can be seen the cement and mud were incompatible with one another, but that the spacer, wherein calcium chloride was the source of multivalent cation, was compatible with each, and even with both the cement and mud together.

EXAMPLE 11

Similar tests using different mud, cement, and spacer formulations also demonstrate similar results. The compositions evaluated were:

Cement:
  Kaiser Class G portland cement
  0.5% BWOC calcium lignosulfonate
  44% BWOC water
Mud:
  15.0 ppg Standard Mud
Spacer:
  water and, BWOW,
  1.7% anhydrous sodium metasilicate
  2% calcium chloride flake
  0.9% CMC
  0.9% sodium citrate dihydrate
  8.8% silica flour (<200 mesh)
  120.8% hematite to yield a 15 lb/gal spacer Tests were run according to Schedule 7, column 6 (197° F BHCT) API Bulletin RP 10B (19th Edition). Results are in Table VII.

TABLE VII

| System | Time (Hr:Min) to 100 Uc |
|---|---|
| Cement alone | 2:17 |
| 20:80 spacer:cement | 3:34 |
| 50:50 cement:mud | 0:37 |
| 1:1:1 spacer:cement:mud | +4:00 |

EXAMPLE 12

Similar tests were run according to API procedures, with the following mud, cement slurry, and spacer:

Mud:
  An 18 lb/gal mud highly treated with lignins
Cement:
  Class H cement and, BWOC, 35% sand
  1.8% a 33 weight percent solution of 40,000-60,000 molecular weight polyethylene imine
  0.5% Lomar D brand condensed naphthalene sulfonate
  0.1% sodium glucoheptonate
  0.1% lignin amine
  10% hematite
  33.6% water
Spacer:
  Water and, BWOW,
  2% sodium metasilicate
  2.2% calcium chloride flake
  1% CMC
  1% sodium citrate dihydrate
  9% ground silica (<200 mesh)

Test conditions were those of Schedule 30, BHCT 204° F. Results are given in Table VIII.

TABLE VIII

| | Initial Viscosity (U$_c$) | Running Viscosity (U$_c$) | Thickening Time (Hr:min) |
|---|---|---|---|
| Spacer 1000 | 30 | 30 | +5:00 |
| Cement | — | — | +5:00 |
| 10:90 Spacer:Cement | 60 | 20 | +5:00 |
| 30:70 Spacer:Cement | 40 | 25 | +5:00 |
| 50:50 Mud:Cement | 100 | — | 0:00 |
| 30:70 Spacer:Mud | 25 | 25 | +5:00 |
| 50:50 Spacer:Mud | 50 | 30 | +5:00 |

EXAMPLE 13

In the Illinois Basin, new wells drilled through the Salem formation at about 2500-3500 feet and the Warsaw formation at about 3800 feet had been cemented using a thixotropic cement, but without using a spacer according to the present invention. Typically, a 7⅞ inch hole was drilled using a bentonite mud, and a 4½ inch casing was set. Fracturing treatments were carried out with gelled aqueous fracturing fluids. Typical production was about 5-15 barrels of oil per day (BOPD) or less, and about 30-40 barrels of water per day (BWPD) or more. Bond logs were run and indicated very poor bonding. Attempts to squeeze off the water zone with cement were generally unsuccessful, resulting in virtually no improvement in the production of oil, or in the water to oil ratio. On other substantially identical wells in the same fields, a spacer such as that described in Example 12 except weighted to about 11.5 pounds per gallon, typically with fly ash, was injected between the mud and the cement. Subsequent bond logs indicated excellent cement jobs were realized. The wells were stimulated in the same manner as previously, and complete zone isolation is indicated by the improvement in production results.

In a particularly successful instance, wells in White County, Indiana were drilled into the Warsaw formation using a 9–10 lb/gallon bentonite mud, cemented with a thixotropic cement, and stimulated with gelled acid. Production was about 1 BOPD, and as high as 200 BWPD. Another well was drilled in the immediate proximity using a similar mud. The mud was displaced using about 15 barrels of the spacer described in the preceding paragraph and a thixotropic cement slurry of the type disclosed in U.S. Pat. No. 3,563,313 was injected immediately thereafter. The well was then stimulated with about 20,000 gallons of gelled 5% acid carrying 50,000 lbs sand. Initial production from the well was about 160 BOPD and no water. Five months later, production stabilized at about 45 BOPD with no water. Despite previous efforts by many, the treatment just described is believed to have been the first time ever that a well was successfully cemented in the Warsaw formation.

What is claimed is:

1. In a method for injecting a fluid into a borehole containing a drilling mud, wherein the fluid is not compatible with the mud, and wherein injection of the fluid is preceded by injection of a spacer composition compatible with both the mud and the fluid, the improvement comprising: injecting a sufficient quantity of said spacer to separate said mud and said fluid, said spacer comprising
   (a) water
   (b) a water soluble alkali metal silicate; and
   (c) a water soluble metal compound capable of releasing a multivalent metal cation to react with the water soluble silicate;
said components (a)–(c) being provided in amounts effective to form an aqueous pumpable gel.

2. The method of claim 1 wherein the spacer also includes a water dispersible cellulose compound and an inert particulate which together impart fluid loss control to said spacer.

3. The method of claim 2 wherein said cellulose compound is present in an amount of from about 0.5 to about 1.5 percent BWOW, and said fluid loss control-providing particulate is present in an amount of from about 1 to about 100 percent BWOW.

4. The method of claim 3 wherein the amounts of cellulose compound and said fluid loss control-providing particulate present in said spacer are from about 0.75–1.25 and 5–15 percent, respectively, BWOW.

5. The method of claim 1 wherein said silicate is present in an amount of from about 0.1–5 percent BWOW, and the metal compound is present in an amount sufficient to release from about 30–130 percent of the molar equivalents of the polyvalent metal cation stoichiometrically required to react with the alkali metal silicate.

6. The method of claim 5 wherein the silicate is present in an amount of from about 0.5–3 percent BWOW, and the metal compound is present in an amount sufficient to release from about 70–100 percent of the polyvalent metal cation stoichiometrically required to react with the silicate.

7. The method of claim 1 wherein the silicate is sodium metasilicate.

8. The method of claim 1 wherein the metal compound is selected from the group consisting of the water soluble oxides, salts, and hydroxides of alkaline earth metals, aluminum, calcium, copper, zinc, iron, and chromium.

9. The method of claim 8 wherein the metal compound provides $Ca^{++}$.

10. The method of claim 1 wherein the spacer contains:
    (a) about 0.1–5 percent BWOW sodium metasilicate;
    (b) from about 70–100 percent of the amount of calcium chloride stoichiometrically required to react with the silicate;
    (c) from about 0.5–1.5 percent BWOW a water dispersible cellulose compound; and
    (d) from about 1–100 percent BWOW an inert particulate having a particle size diameter of from about 1 to about 100 microns, which cooperates with the cellulose compound to impart fluid loss control to said spacer.

11. The method of claim 10 wherein the spacer contains about 1 percent BWOW carboxymethylcellulose and about 10 percent BWOW silica flour of less than about 200 mesh for fluid loss control.

12. The method of claim 10 wherein the spacer also contains a weighting material to increase the density of the spacer.

13. The method of claim 10 wherein the spacer also contains a weak chelating agent for polyvalent metal cations, in an amount up to about 2 percent, BWOW.

14. The method of claim 1 wherein the mud is a water based mud or an oil-in-water emulsion mud.

15. In a well treating method for displacing drilling mud from a borehole having a conduit therein so that fluid may be injected down the inside of said conduit and back to the surface via the annulus surrounding said conduit, or vice versa, the improvement which comprises displacing said mud with an aqueous pumpable gel prepared from components including
    (a) water
    (b) a water soluble alkali metal silicate; and
    (c) a water soluble metal compound capable of releasing a multivalent metal cation to react with the water soluble silicate;
said components (a)–(c) being provided in amounts effective to form a pumpable gel which does not react with the mud to form an unpumpable mass.

16. The method of claim 15 wherein the mud is of the water based type or oil-in-water emulsion type.

17. The method of claim 15 wherein the silicate is a sodium silicate.

18. The method of claim 17 wherein the metal cation is $Ca^{++}$.

19. The method of claim 17 wherein the silicate is sodium metasilicate.

20. The method of claim 19 wherein the metal compound is calcium chloride.

21. The method of claim 15 wherein the components from which the gel is prepared include a water dispersible cellulose compound and an inert particulate which together impart fluid loss control to said gel.

22. The method of claim 21 wherein from about 0.5–1.5 percent said cellulose compound, BWOW, and from about 1–100 percent said particulate, BWOW, are employed in preparing said gel to impart fluid loss control to said gel.

23. The method of claim 22 wherein the cellulose compound is selected from the group consisting of an alkyl cellulose, a carboxyalkyl cellulose, a hydroxyalkyl cellulose, and a carboxyalkyl hydroxyalkyl cellulose, and wherein the particulate is selected from the group consisting of silica flour, pozzolan, flyash, dictomaceous earth, calcium carbonate, barium sulfate, and talc.

24. The method of claim 23 wherein from about 0.75–1.25 percent BWOW carboxymethylcellulose, and from about 5–15 percent BWOW silica flour having an average particle size diameter of from about 1 to 100 microns are employed in the gel.

25. The method of claim 15 wherein from about 0.1 to about 5 percent BWOW silicate, and a sufficient amount of the metal compound to release from about 30–130 percent of the molar equivalents of the polyvalent metal cation stoichiometrically required to react with the silicate, are employed in the preparation of the gel.

26. The method of claim 25 wherein the gel is prepared from components including water and:
 about 0.5–3 percent BWOW anhydrous sodium metasilicate;
 about 70–100 percent of the amount of calcium chloride stoichiometrically required to react with the sodium metasilicate;
 about 1 percent BWOW carboxymethylcellulose; and
 about 10 percent BWOW silica flour having an average particle size less than of about 200 mesh.

27. The method of claim 26 wherein the gel includes a weighting agent effective to increase the density of the gel to greater than that of the mud being displaced.

28. In a method for cementing a conduit in a borehole containing a drilling mud wherein at least part of the mud is displaced from the borehole by a spacer fluid and the cement is circulated into position immediately following the spacer fluid, the improvement which comprises: employing as the spacer fluid, a pumpable gel prepared from components including
 (a) water;
 (b) a water soluble alkali metal silicate; and
 (c) a water soluble metal compound capable of releasing a multivalent metal cation to react with the water soluble silicate;
said components (a)–(c) being provided in amounts effective to form a pumpable gel which does not react with either the mud or the cement to form an unpumpable mass.

29. The method of claim 28 wherein components (b) and (c) are provided in the following amounts, respectively: (b) from about 0.1–5 percent BWOW, and (c) in an amount sufficient to release from about 30 to about 130 percent of the molar equivalents of the polyvalent metal cation stoichiometrically required to react with the alkali metal silicate.

30. The method of claim 28 wherein the spacer also includes a water dispersible cellulose compound and an inert particulate which together impart fluid loss control to said gel.

31. The method of claim 30 wherein the spacer is prepared from water and:
 from about 0.1–5 percent BWOW alkali metal silicate;
 the metal compound in an amount sufficient to release from about 30 to about 130 percent of the molar equivalents of the polyvalent metal cation stoichiometrically required to react with alkali metal silicate;
 from about 0.5–1.5 percent BWOW the cellulose compound; and
 from about 1–100 percent BWOW particulate having a particle size diameter of from about 1 to 100 microns.

32. The method of claim 31 wherein the spacer also contains a weak chelating agent for polyvalent metal cations, in an amount up to about 2 percent, BWOW.

33. The method of claim 32 wherein the spacer also includes a material for preventing lost circulation.

34. The method of claim 28 wherein the cement has a density greater than the mud and the spacer is prepared from components including water and:
 anhydrous sodium metasilicate, about 0.1–5 percent, BWOW;
 calcium chloride in an amount sufficient to provide from about 0.3 to about 1.3 moles $Ca^{++}$ per mole of sodium metasilicate;
 carboxymethyl cellulose, about 0.5–1.5 percent, BWOW;
 silica flour having a particle size diameter of from about 1 micron to about 100 microns, about 1–100 percent, BWOW;
 a weak chelating agent selected from the group consisting of citric acid, alkali metal citrates, alkali metal hexametaphosphates, alkali metal tetraphosphates, alkali metal bicarbonates, and sodium acid pyrophosphate, in an amount up to about 2 percent BWOW; and
 a weighting agent effective to adjust the density of the spacer to greater than that of the mud but less than that of the cement.

35. The method of claim 34 wherein the following amounts of the respective components are employed in the preparation of the spacer:
 anhydrous sodium metasilicate, about 0.5–3 percent BWOW;
 calcium chloride in an amount sufficient to provide from about 0.7–1 mole $Ca^{++}$ per mole of sodium metasilicate;
 carboxymethyl cellulose, about 0.75–1.25 percent, BWOW;
 silica flour, about 5–15 percent BWOW; and
 sodium citrate dihydrate, about 1 percent BWOW.

36. The method of claim 35 wherein a volume of spacer is employed sufficient to separate the mud from the cement by at least about 500 feet, calculated on the basis of the average cross sectional area of the annulus.

37. The method of claim 28 wherein the mud is of the water based type or oil-in-water emulsion type.

38. In a method for acidizing or fracturing a formation penetrated by a borehole initially containing a drilling mud, wherein a casing is cemented into position within said borehole prior to said acidizing or fracturing step, the improvement which comprises:
 (a) temporarily positioning said casing in said mud-containing borehole;
 (b) providing a spacer comprised of water, a water soluble alkali metal silicate, and a water soluble metal compound capable of releasing a multivalent metal cation to react with the water soluble silicate, said spacer components being provided in amounts effective to form a pumpable gel;

(c) displacing at least a portion of said mud from said borehole with said spacer;

(d) injecting a cement slurry into said borehole immediately following said spacer and circulating said slurry into position;

(e) permitting said slurry to set, thereby permanently cementing said casing into position; and (f) thereafter carrying out said acidizing or fracturing step; the quantity of spacer employed being sufficient to separate said mud from said cement.

39. The method of claim 38 wherein the mud is of the water based type, or of the oil-in-water emulsion type.

40. The method of claim 38 containing a weak chelating agent for polyvalent metal cations in an amount up to about 2 percent, BWOW.

41. The method of claim 38 wherein the spacer includes a water dispersible cellulose compound and an inert particulate which together impart fluid loss control to said spacer.

42. The method of claim 38 wherein a volume of spacer is employed sufficient to separate the mud from the cement by at least 500 feet, calculated on the basis of the average cross sectional area of the annulus.

43. The method of claim 38 wherein the spacer contains:
alkali metal silicate, about 0.1-5 percent, BWOW;
metal compound, an amount sufficient to release from about 30 to about 130 percent of the molar equivalents of the polyvalent metal cation stoichiometrically required to react with the alkali metal silicate;
cellulose compound, about 0.5-1.5 percent BWOW; and
an inert particulate having a particle size diameter ranging from 1 to 100 microns, 1-100 percent BWOW.

44. The method of claim 43 wherein the cement slurry has a density greater than that of the mud and the spacer contains a weighting material to adjust the density of the spacer to greater than that of the mud but less than that of the cement slurry.

45. The method of claim 44 wherein the spacer contains:
sodium metasilicate, about 0.5-3 percent, BWOW;
calcium chloride, about 0.7-1 mole per mole of sodium metasilicate;
carboxymethyl cellulose, about 0.75-1.25 percent, BWOW;
silica flour as the inert particulate, about 5-15 percent BWOW; and wherein
sufficient spacer is employed to separate the cement slurry from the mud by at least about 500 feet, calculated on the basis of the average cross sectional area of the annulus.

46. An aqueous fluid composition suitable for use as a spacer in treating wells comprising:

(a) water, and effective amounts of (b) a water soluble alkali metal silicate, (c) a water soluble metal compound capable of releasing a multivalent metal cation to react with the water soluble silicate to form a pumpable gel, and (d) a water dispersible cellulose compound and an inert particulate which together impart fluid loss control to said composition.

47. The fluid of claim 46 containing a weighting material to increase the density thereof.

48. The fluid of claim 46 containing a weak chelating agent for polyvalent metal cations, in an amount up to about 2 percent, BWOW.

49. The fluid of claim 46 comprising
an alkali metal silicate, about 0.1-5 percent, BWOW;
a metal compound in an amount sufficient to release from about 30 to about 130 percent of the molar equivalents of the polyvalent metal cation stoichiometrically required to react with the alkali metal silicate;
a water dispersible cellulose compound, about 0.5-1.5 percent, BWOW; and
an inert particulate having a particle size ranging from about 1 to 100 microns, about 1-100 percent, BWOW.

50. The fluid of claim 49 containing a weighting agent selected from the group consisting of fly ash, barium sulfate, pozzolan, hematite, and ilmenite.

51. The fluid of claim 50 wherein the silicate is sodium metasilicate and the metal compound is calcium chloride.

52. The fluid of claim 51 containing:
sodium metasilicate, about 0.5-3 percent BWOW;
calcium chloride, about 0.7-1 mole per mole of sodium metasilicate;
carboxymethyl cellulose, about 0.75-1.25 percent, BWOW;
silica flour as the inert particulate, about 5-15 percent BWOW; and
sodium citrate dihydrate, about 1 percent BWOW.

53. The fluid of claim 52 containing, BWOW, about 1 percent carboxymethyl cellulose and about 10 percent silica flour which passes a 200 mesh screen, U.S. Sieve Series.

54. A blend of solids suitable for use as an additive to water to form an aqueous spacer for treating wells, said blend comprising:

(a) from about 0.1 to about 5 parts by weight a water soluble alkali metal silicate;

(b) a water soluble metal compound capable of releasing a multivalent metal cation to react with the water soluble silicate, in an amount sufficient to release from about 30 to about 130 percent of the molar equivalents of the polyvalent metal cation stoichiometrically required to react with the alkali metal silicate;

(c) from about 0.5 to about 1.5 parts by weight a water dispersible cellulose compound; and (d) from about 1 to about 100 parts an inert particulate which, when said blend is added to water in an effective amount, cooperates with said cellulose compound to impart fluid loss control to said spacer.

55. The blend of claim 54 including a weak chelating agent for polyvalent metal cations, in an amount up to about 2 parts by weight, selected from the group consisting of citric acid, alkali metal citrates, alkali metal hexametaphosphates, alkali metal tetraphosphates, alkali metal bicarbonates, and sodium acid pyrophosphate.

56. The blend of claim 55 consisting essentially of, by weight:
about 13.2 percent anhydrous sodium metasilicate;
about 14.4 percent calcium chloride flake containing 77-80 weight percent active $CaCl_2$;
about 6.6% percent carboxymethyl cellulose;
about 60 percent ground silica having an average particle size of less than about 200 mesh; and about 6.6 percent sodium citrate dihydrate.

57. The blend of claim 54 including a weighting material selected from the group consisting of fly ash, barium sulfate, pozzolan, hematite, and ilmenite.

58. The blend of claim 54 including
anhydrous sodium metasilicate, about 0.5-3 parts;
calcium chloride, about 0.7-1 mole per mole of sodium metasilicate;
silica flour having an average particle size of less than about 200 mesh as the inert particulate, about 5-15 parts;
carboxymethyl cellulose, about 0.75-1.25 parts; and
sodium citrate dihydrate, about 1 part.

* * * * *

UNITED STATES PATENT AND TRADEMARK OFFICE
CERTIFICATE OF CORRECTION

PATENT NO. : 4,083,407

DATED : April 11, 1978

INVENTOR(S) : Thomas J. Griffin, Jr., Larry K. Moran

It is certified that error appears in the above-identified patent and that said Letters Patent are hereby corrected as shown below:

Table II, line 28, last three columns should read:
--- thick but pours easily ---

Table II, line 38, under heading "30:70" should read
--thick but shakes easily--.

Table III, line 19, third column, "1.0 CMC" should read
--1.0% CMC--.

Signed and Sealed this

*Twenty-first* Day of *November 1978*

[SEAL]

*Attest:*

RUTH C. MASON
*Attesting Officer*

DONALD W. BANNER
*Commissioner of Patents and Trademarks*